United States Patent
Schulte et al.

(10) Patent No.: US 9,033,387 B2
(45) Date of Patent: May 19, 2015

(54) TRIM PANEL

(71) Applicant: Dura Automotive Body & Glass Systems GmbH, Plettenberg (DE)

(72) Inventors: Martin Schulte, Balve (DE); Jens Vornbaumen, Altena (DE)

(73) Assignee: DURA AUTOMOTIVE BODY AND GLASS SYSTEMS, GMBH, Plettenberg (DE)

(*) Notice: Subject to any disclaimer, the term of this patent is extended or adjusted under 35 U.S.C. 154(b) by 0 days.

(21) Appl. No.: 13/705,395

(22) Filed: Dec. 5, 2012

(65) Prior Publication Data
US 2013/0140840 A1 Jun. 6, 2013

(30) Foreign Application Priority Data
Dec. 5, 2011 (DE) .................. 10 2011 056 016

(51) Int. Cl.
| | | |
|---|---|---|
| *B60R 13/04* | (2006.01) | |
| *B29C 45/00* | (2006.01) | |
| *B62D 25/02* | (2006.01) | |
| *B62D 29/04* | (2006.01) | |
| *B29K 21/00* | (2006.01) | |
| *B29L 31/30* | (2006.01) | |
| *B29K 105/06* | (2006.01) | |

(52) U.S. Cl.
CPC .......... *B60R 13/04* (2013.01); *B29K 2021/006* (2013.01); *B29L 2031/3041* (2013.01); *B29L 2031/3005* (2013.01); *B29K 2105/06* (2013.01); *B29C 45/0001* (2013.01); *B29C 45/0005* (2013.01); *B29C 2045/001* (2013.01); *B29L 2031/3055* (2013.01); *B29C 45/0025* (2013.01); *B29C 45/0053* (2013.01); *B29C 2045/0079* (2013.01); *B62D 25/02* (2013.01); *B62D 29/043* (2013.01)

(58) Field of Classification Search
CPC .......... B60J 5/04; B60J 5/0402; B60J 5/0481; B60R 13/04; B60R 13/043; B60R 13/06; B62D 25/04
USPC ........ 296/1.07, 1.08, 93, 146.2, 146.9, 181.2; 49/500.1, 501
See application file for complete search history.

(56) References Cited

U.S. PATENT DOCUMENTS

| | | | | |
|---|---|---|---|---|
| 5,092,078 | A * | 3/1992 | Keys | 49/441 |
| 6,103,168 | A * | 8/2000 | Kelly | 264/259 |
| 7,121,060 | B1* | 10/2006 | Cittadini et al. | 52/716.5 |
| 8,360,493 | B2* | 1/2013 | Gerndorf et al. | 296/1.08 |
| 2010/0115851 | A1* | 5/2010 | Nakao et al. | 49/502 |
| 2011/0148139 | A1* | 6/2011 | Gerndorf et al. | 296/146.7 |

FOREIGN PATENT DOCUMENTS

| | | |
|---|---|---|
| DE | 3523409 C1 | 9/1986 |
| DE | 29913835 U1 | 11/1999 |
| DE | 69808484 T2 | 7/2003 |

(Continued)

OTHER PUBLICATIONS

German to English translation of DE 10 2008 056 146, cited by applicant, retrieved on Oct. 14, 2013 from patenttranslate via the EPO website Espacenet.*

*Primary Examiner* — Jason S Daniels
(74) *Attorney, Agent, or Firm* — Gifford, Krass, Sprinkle, Anderson & Citkowski, P.C.

(57) ABSTRACT

The invention relates to a trim panel for the body of a motor vehicle. The trim panel includes a basic body formed of a thermosetting plastic.

13 Claims, 1 Drawing Sheet

(56) References Cited

FOREIGN PATENT DOCUMENTS

| | | |
|---|---|---|
| DE | 69819212 T2 | 7/2004 |
| DE | 102008056146 A1 | 5/2010 |
| EP | 1584517 A2 * | 10/2005 |
| WO | 2011060163 A1 | 5/2011 |

* cited by examiner

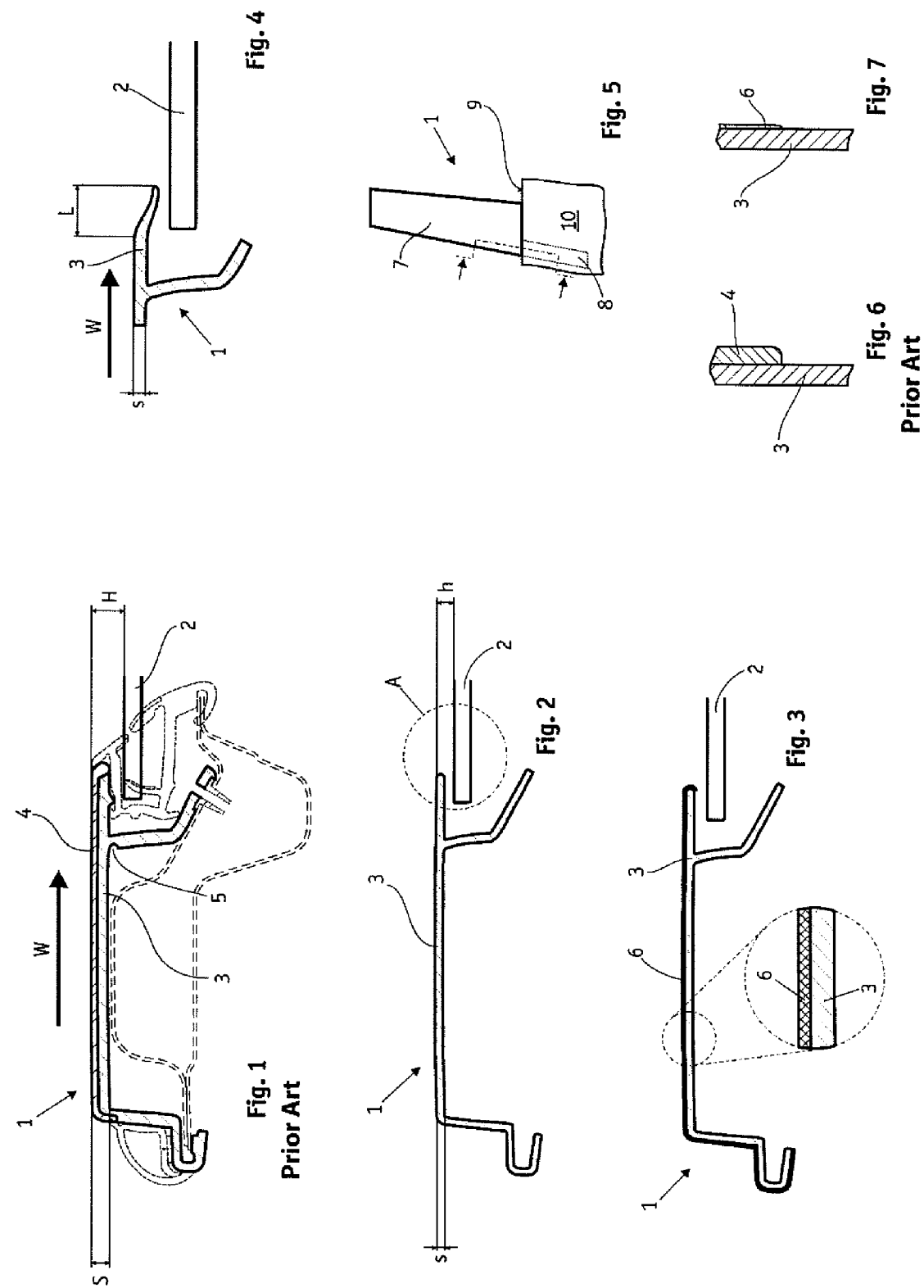

TRIM PANEL

CROSS-REFERENCE TO RELATED APPLICATIONS

This Application claims priority to German Application No. DE 102011056016.5 filed on Dec. 5, 2011 in Germany and is herein incorporated by reference.

FIELD OF THE INVENTION

The invention relates to a trim panel for the body of a motor vehicle.

BACKGROUND OF THE INVENTION

Trim panels for the bodies of motor vehicles are known. They serve to visually and aerodynamically bridge gaps between different outer skin parts of the body. In addition, they serve as support structure for functional components such as for example a seal. A typical application example is the pillar panel, which covers the load-bearing bodywork parts of the A, B, C or D-pillar. Another example is the frame-like trim panel in the region of the windscreen opening of the body.

The requirements on trim panels, in particular on the surface quality on the outside, i.e. the visible side, are very high because of their function which co-shapes the vehicle outside, visually. A very high surface quality is demanded, wherein the surface is to be additionally embodied to be impact and scratch resistant as well as weather and aging-resistant. Apart from this, the material of the trim panel must be employable over a large temperature range and must only have minor temperature-related distortion values. On the other hand, ductile-elastic characteristics are demanded for certain functions, namely in particular, where the material interacts with the body, for example in order to realize snap hooks, which are to resiliently engage behind the vehicle body or of regions, into which the thread-shaping or thread-cutting screws are to cut.

For the aforementioned reasons, trim panels were developed in the past, which are produced from thermoplastics by a multi-component injection molding method. There, the portions of the trim panels located towards the non-visible side, which frequently have a load-bearing function, are produced from a sufficiently ductile material such as for example from ABS (acrylonitrile butadiene styrene). By contrast, the portions located on the visible side of the trim panels are produced from a material which makes possible a very high surface quality ("class A") even without reworking. Used for example is a PMMA (polymethylmethacrylate).

Such a construction however requires a high material strength of the trim panel, which in particular is due to the sufficiently known restrictions of the thermoplastic injection molding. Added to this is that in the case of cross-sectional chunks or material accumulations in the injection-molded trim panels, such as are typical for example in the region of the attachments of stiffening ribs, it has to be ensured with elaborate measures that as a consequence of the higher absolute shrinkage during the cooling of the material at this location with material accumulation, no subsidence locations develop on the surface of the visible side directed to the outside.

Starting out from this prior art, the invention is based on the object of providing a trim panel for the body of a motor vehicle, with which the disadvantages described above can be largely eliminated. In particular, the trim panel may include a design-appropriate embodiment preferably without production-related restrictions and has high-quality visual characteristics and a low weight.

SUMMARY OF THE INVENTION

A trim panel according to the invention for the body of a motor vehicle, in particular a panel for the A, B, C, D-pillar of the body or for the windscreen-roof frame wherein the trim panel includes a basic body, which in a particular configuration can also represent the entire trim panel, which is produced from a thermosetting plastic and is formed of a thermosetting plastic.

The use according to the invention of one or a plurality of thermosetting plastics (preferentially 1-component) for forming the basic body of the trim panel has a multiplicity of advantages. In addition to the favorable process ability of thermosetting plastics also within the scope of a large series production, in particular through injection molding and pressing (including all sub and mixed forms of these methods, in particular injection stamping), in particular the following advantages must be emphasized: thermosetting plastics can be adjusted with respect to their viscosity and their adhesive tendency in a wide range, as a result of which the production in particular within the scope of the abovementioned methods is simplified. Added to this is the favorable controllability of the hardening of the material, as a result of which, other than with the cooling of hardening thermoplastics, even thin and large-area components can be produced by injection-molding and/or pressing without problems. This makes thus possible the production of trim panels that are comparatively thin relative to conventional trim panels of thermoplastics. Restrictions of the material thickness materialize only through the required mechanical strength of the component and less through limits already posed by the production process. The component weight can be reduced and the aerodynamic characteristics of the body provided with said component can be positively influenced through design measures, which a designer was not able to use in the past. This can also have a positive effect visually, for example through a more surface-flush appearance. The high density of the thermosetting plastic can additionally improve the haptic and the acoustic behavior of the trim panel. Thermosetting plastics additionally have a very low distortion tendency in many instances, which makes possible the production of almost distortion-free trim panels. In addition, thermosetting plastics are characterized by a low post-shrinkage, which are particularly advantageous with respect to passing alternating climate tests, to which motor vehicles are exposed within the scope of the development. Through the positive shrinkage characteristics, a wall thickness-rib ratio can be additionally changed in the direction of 1:1, as a result of which sturdy trim panels with low weight can be produced. Added to this are a very low expansion during heat storage and almost continuous mechanical characteristics in the temperature range of $-40°$ C. to $150°$ C. that is relevant for motor vehicle bodies. Furthermore, many thermosetting plastics are characterized by low material costs, which lower the component costs. Added to this is that sealing foams or other elements in many cases favorably adhere to the thermosetting plastic even without additional process steps.

In a preferred embodiment of the trim panel according to the invention, the basic body is at least partially or completely produced from BMC (bulk molding compound) or SMC (sheet molding compound), in particular in the form of so-called low profile or low shrinkage molding compounds. These plastic fiber composites include thermosetting plastics and may include further filling materials for a specific characteristic modulation and which are frequently present in the form of molding compounds that are similar to plasticine. The compounds make possible the cost-effective production of trim panels within the scope of the abovementioned methods for large series production, i.e. in particular by means of injection molding or pressing, including all sub and mixed forms of these methods, in particular injection stamping. The methods produce parts with simultaneously high mechanical strengths (among other things because of the fiber reinforcement) and favorable surface characteristics ("class A" surfaces).

The use of thermosetting plastics for producing the trim panel or the basic body of the trim panel according to the invention makes possible in particular the advantageous production of components which with respect to conventional trim panels of thermoplastics can be embodied very thinly. It has proved to be advantageous if the thickness of the areal portions of the basic body, i.e. such portions without reinforcements, transitions, etc., does not amount to substantially more than 3 mm and preferentially not more than approximately 2 mm. Because of this, in conjunction with the mechanical strengths of the thermosetting plastics and in particular of BMC or SMC, a trim panel can be created, which despite relatively low wall thickness has a strength that is adequate for non-load bearing components of the outer skin of a body. With a wall thickness of approximately 2 mm, the wall thickness of conventional trim panels, which amounts to approximately 4 mm, can be reduced by up to 50%.

The advantageous characteristics of thermosetting plastics, which make possible the production of particularly thin areal components also in the mentioned methods for the large series production, also make possible a preferred configuration of the basic body such that the latter tapers towards the edge in at least one edge region. Because of this, the possibility of an aerodynamically and also visually advantageous configuration of the trim panel is created for a configuration becoming thinner towards the edge cannot only positively influence the aerodynamics, for example in the form of a preferably low separation edge, but also improves the possibilities for realizing as surface-flush an appearance of the body as possible. With a view to the advantageous aerodynamic characteristics that can be achieved, such a taper should be provided in particular for such edges of the trim panel which by forming a step-like shoulder to the adjoining vehicle surface, in particular to the adjoining window surface, constitute a flow separation edge on which wind noises or turbulences can undesirably occur. It is pointed out that such a material thickness tapering cannot be realized with conventional trim panels from thermoplastics, because on the one hand the material strength of thermoplastics does not permit such a reduction of the material thickness and because on the other hand the necessary low spacing of the injection mold jaws necessary for such a material thickness reduction is problematic on account of the cooling of the injection molding compound that is too rapid with the injection molding process. The chemically hardening molding compounds provided for the trim panels according to the invention ensure a uniform molded part filling in the injection molding process even with low wall thicknesses, in part due to a favorable flow behavior within the tool.

The tapered edge region of the trim panel can for example be achieved through an angled-off and/or arch-shaped curve of a side of the basic body serving as a visual side of the trim panel.

Furthermore, the basic body of the trim panel can be provided with a coating in at least one portion, which in particular can be designed in the form of a paint layer and/or in addition to a paint layer, can comprise further layers such as for example a priming layer. This makes possible the color coating matched to the remaining outer skin parts of the body, provided the desired color coding cannot already be achieved through suitable filler materials. Thus, even minute color deviations relative to the body paintwork later on can be avoided. Particularly preferably, a high-gloss black paint coating may be employed as a coating. Since the coating of the basic body, in particular with a paint layer, because of the corrosion resistance of the thermosetting plastics frequently serves only for visual reasons, it can be preferentially provided to provide the coating on a side of the basic body serving as visible side of the trim panel and in particular only on this visible side. The component surface can for example be provided with a paint system such as a urea based, EPS polyester based or polyurethane bases paint system. Alternatively, the use of thermosetting plastics for forming the basic body of the trim panel according to the invention can also make possible a through-coloring of the plastic, as a result of which a cost-effective possibility of coloring can be realized. In an additional preferred embodiment of the trim panel according to the invention it can be provided to form the thermosetting plastic for forming the basic body in an electrically conductive manner, which can be achieved by admixing electrically conductive filler materials. Through the electrically conductive compounding, the possibility is created in particular to coat the trim panel according to the invention, if required jointly with other metallic outer skin components of the body, in an electrostatic coating and in particular painting method in a particularly scratch-resistant manner.

The trim panel according to the invention can furthermore comprise one or a plurality of functional elements fastened to the basic body. These can in particular consist of elastomers or also of a liquid silicone and for example serve as sealing elements and/or elastic spacing members which make possible the vibration-free and low-noise fastening of the trim panel to the body. The forming of the basic body from thermosetting plastic according to the invention in this case has the advantage that many elastomers can be fixed to the plastic even without additional process steps or adhesive means. In addition it offers the possibility of integrating the functional element or functional elements in the basic body within the scope of its production, as is possible for example within the scope of a multi-component injection molding method.

BRIEF DESCRIPTION OF THE DRAWINGS

FIG. 1 is a trim panel according to the prior art in a cross section;

FIG. 2 is a first embodiment of a trim panel according to the invention in a cross section;

FIG. 3 is a second embodiment of a trim panel according to the invention in a cross section;

FIG. 4 is a part cross section of a third embodiment of a trim panel according to the invention in the part region A marked in FIG. 2;

FIG. 5 is one of the trim panels according to the FIGS. 1 to 4 in a lateral view;

FIG. 6 is a longitudinal section through the trim panel according to FIG. 1 in the portion marked in the FIG. 5; and FIG. 7 is a longitudinal section through the trim panel according to FIG. 3 in the portion marked in the FIG. 5.

DETAILED DESCRIPTION OF THE PREFERRED EMBODIMENTS

FIG. 1 shows a trim panel 1 for the body of a motor vehicle according to the prior art in a cross section. Concretely, this is a trim panel 1, which exemplarily additionally forms a guide for a vertically displaceable side window 2 of the motor vehicle and which via fastening elements that are not shown is connected to a support structure of the body.

The window frame 1 is produced as multi-component injection molding from thermoplastics and comprises a basic body 3 of a tough-ductile thermoplastic (e.g. ABS), which forms the non-visible side of the trim panel 1 and because of its specific mechanical characteristics, forms holding members of the trim panel 1. The basic body 3 forms a U-shaped mounting in the wider sense via a web originating on the inside, within which, subject to the intermediate connection of a sealing element inserted in the mounting, an edge region of the side window 2 is guided.

Since an injection molding of a tough-ductile thermoplastic is not suitable for the visible side of a trim panel, which does not allow achieving an adequate surface quality and scratch-resistance, the basic body 3 is connected to a covering body 4 of impact-tough rather glass-like thermoplastics (e.g. PMMA). The latter forms the surfaces which constitute the visible side of the trim panel. The use of for example PMMA makes possible forming "class A"-appropriate surfaces directly during injection molding, i.e. without relevant reworking. The connection of the two components is preferably realized in the two-component injection molding process.

The production of the trim panel 1 in the multi-component injection molding process required for visual reasons in conjunction with the material-specific restriction of the minimal thicknesses of the basic body 3 that can be achieved for example from ABS and of the covering body 4 for example from PMMA results in that such conventional trim panels 1 are currently not produced with a wall thickness "S" lower than approximately 4 mm and additionally not with different regions having varying material thicknesses. Edges tapering towards the margin as would be desirable for visual and aerodynamic reasons cannot be realized. Added to this is that the height "H" of the step-like transition from the visible side surface of the trim panel 1 to the surface of the window pane 2 is relatively large, so that in this region undesirable and aerodynamically unfavorable turbulences due to the headwind "W" occur. In addition to this, indentations 5 on the non-visible side have to be provided with such conventional trim panels in many cases in order to avoid material agglomerations, which, because of the thin uneven shrinkage behavior, could lead to subsidence locations which are noticeable also on the visible side and are therefore unacceptable. During the production, these indentations 5 frequently constitute undercuts, which could render de-molding of the components more difficult and unnecessarily complicate an injection molding tool.

The FIGS. 2 to 4 show three exemplary embodiments of a trim panel. The features shown in the respective Figures can be realized jointly or in each case individually and are, each taken on its own and also in their entirely as independent inventions.

The trim panel 1 of the three embodiments includes a basic body 3, which forms the entire (FIG. 2 and FIG. 4) or almost the entire window frame (FIG. 3). The basic body 3 was produced from BMC as part of an injection molding process, as a result of which a component was created that not only has adequate strength to fulfill the load-bearing function of the part but also makes available a "class A"-appropriate surface quality even without reworking. Because of this, the trim panel 1, when colored through with the desired tone of color, can be directly employed as outer skin part of the body or with paint without further coatings provided for improving the surface quality. FIG. 3 shows such an embodiment of a window frame according to the invention, in the case of which the basic body 3, if required, after the applying of a prime coat (not shown) was coated with a thin paint layer 6.

Through the production of the basic body 3 from a glass fiber-permeated thermosetting plastic molding compound a material thickness "s" of the window frame can be achieved, which in the areal portions is configured thinner than the counterpart of thermoplastics known from FIG. 1 (s☐S applies). Despite this, an adequate mechanical strength is achieved, namely even with a preferred material thickness of the basic body of approximately 2 mm. With a coating with a paint layer (see FIG. 3), the paint layer thickness, which depending on the applied coating method or paint used, can amount up to approximately 500 μm, has to be added so that the overall thickness then amounts to approximately 2.5 mm. A component that is light compared with a conventional trim panel and visually more unobtrusive component can be created. Further, the spacing of the visible side surface from the window surface "h" can be significantly reduced (h☐H applies), namely at least by the amount by which the material is reduced such as by approximately 2 mm.

Additionally, because of the substantially non-existing shrinkage behavior of the thermosetting plastic employed, the forming of the indentations 5 in the region of the transverse web attachments frequently required with the conventional trim panels can be omitted (see relevant locations at the trim panels of FIGS. 2 to 4), as a result of which a de-molding of the component after the production is facilitated and the tool manufacture simplified.

With the exemplary embodiment of FIG. 4, the marginal region constituting a part of the visible side of the window frame 1 tapers towards the margin to a thickness of approximately 0.4 mm, as a result of which not only an aerodynamic advantage through the formation of a small separation edge can be achieved (the arrow in FIG. 3 shows the direction of the headwind W), but as surface-flush a transmission from the trim panel 1 to the surface of the window pane 2 as possible which is desired in many cases for visual reasons, is obtained. Such a tapering, in the shown example from 2 mm to approximately 1 mm, with favorable technical preconditions to up to 0.5 mm or even 0.4 mm, cannot be realized by the injection molding method with thermoplastics that harden because of the cooling, since the process-safe entering of the thermoplastics in the injection molding process in such narrow tool gaps with the lengths and surfaces to be produced in this application case cannot be guaranteed. The targeted temperature-controlling of a tool, with which this would be at least theoretically conceivable even with thermoplastics, is no alternative for the production of a cost-effective motor vehicle body component because of the tool expenditure and the required cycle times.

Here, the tapering region evidently extends over a length (L) which is longer by a multiple than the material thickness "s". Preferably, L>2×s applies, further preferably L>3×s applies.

FIG. 5 shows the window frames 1 of FIGS. 1 to 4 in a lateral view initially for illustration purposes. There it is evident that it is divided into two portions, which significantly differ in the width. While the upper, wider portion 7 is a visible portion of the window frame 1, the lower, narrower portion 8 in the assembled state dips into the breast of the door of the motor vehicle and is therefore is not visible from the outside on the produced motor vehicle.

With the configuration of the window frame 1 according to the prior art (FIG. 1) it is necessary to provide the covering body 4 serving in particular visual reasons only in the visible portion 7; the lower portion 8 of the trim panel 1 by contrast merely consists of the basic body 3, which dips into the door breast 9 and in the assembled state is covered by the panel 10 of the vehicle door. The cross-sectional overlap resulting from this and shown in the longitudinal section of FIG. 6 constitutes a weak point that is subjected to stress peak loads as a result of a notch effect, which increases the fracture tendency of the trim panel 1 at this point and as a consequence can lead to a component failure.

Such a cross-sectional overlap is not present with the trim panels (FIGS. 2 to 4) according to the invention because of the constant thickness design. At most, an extremely small cross-sectional overlap can be provided when the visible portion 7 is coated with a paint layer 6 (see FIG. 7). The notch effect connected with this however is negligible, since the paint layer 6 exclusively serves for visual reasons and other than the covering layer 5 with the trim panel 1 according to the prior art does not cause any stress peaks as a result of the low layer thickness.

The design details of the three exemplary embodiments described cannot only be applied merely in the concrete combination disclosed, but these can also be applied in any combination even with any other trim panels according to the invention. For example, the embodiment according to FIG. 4 can be provided with a coating (paint layer 6) according to the exemplary embodiment of FIG. 3.

LIST OF REFERENCE NUMBERS

1 Trim panel
2 Side window
3 Basic body
4 Covering body
5 Indentation
6 Paint layer
7 Visible, upper portion
8 Covered, lower portion
9 Door breast
10 Body panel

The invention claimed is:

1. A pillar panel, which covers the load bearing bodywork parts of the A, B, C or D-pillar of the body of a motor vehicle comprising:
an A, B, C or D-pillar structure;
a basic body attached to the pillar structure, the basic body formed of a thermosetting plastic and wherein the basic body has areal portions having a maximum thickness of 3 millimeters and wherein the material thickness of the basic body becomes thinner towards an edge in at least one edge region, the edge region including a step-like shoulder to an adjoining window surface, the basic body including a class A surface.

2. The pillar panel according to claim 1, wherein the basic body is formed of BMC molding compound or from SMC molding compound.

3. The pillar panel according to claim 1 wherein the thickness of areal portions of the basic body has a thickness of approximately 2 mm.

4. The pillar panel according to claim 1, wherein the edge region includes an angled-off and/or arch-shaped curve of a side of the basic body serving as visible side of the trim panel.

5. The pillar panel according to claim 1 wherein the basic body includes at least one portion having a coating.

6. The pillar panel according to claim 5, wherein the coating includes a paint layer.

7. The pillar panel according to claim 5, wherein the coating is applied to a side of the basic body serving as a visible side of the trim panel.

8. The pillar panel according to claim 1 wherein the thermosetting plastic is electrically conductive.

9. The pillar panel according to claim 1 further including functional elements attached thereon.

10. The pillar panel according to claim 9 wherein the functional elements are formed of an elastomer fastened to the basic body.

11. The pillar panel according to claim 5 wherein the coating is applied electrostatically.

12. The pillar panel according to claim 1 wherein the basic body is formed by a multi-component injection molding process.

13. The pillar panel according to claim 1 wherein the basic body in the edge region tapers to a thickness less than or equal to 1 mm.

* * * * *